US008882366B2

(12) United States Patent
Miao et al.

(10) Patent No.: US 8,882,366 B2
(45) Date of Patent: Nov. 11, 2014

(54) CHIP IDENTIFICATION PADS FOR IDENTIFICATION OF INTEGRATED CIRCUITS IN AN ASSEMBLY

(75) Inventors: Jason Y. Miao, Sunnyvale, CA (US); Curtis B. Robinson, Jr., Sunnyvale, CA (US); Georgios Kalogerakis, Mountain View, CA (US); Gerald L. Dybsetter, Scotts Valley, CA (US); Luke M. Ekkizogloy, Mountain View, CA (US)

(73) Assignee: Finisar Corporation, Sunnyvale, CA (US)

(*) Notice: Subject to any disclaimer, the term of this patent is extended or adjusted under 35 U.S.C. 154(b) by 177 days.

(21) Appl. No.: 13/426,506

(22) Filed: Mar. 21, 2012

(65) Prior Publication Data

US 2013/0148978 A1  Jun. 13, 2013

Related U.S. Application Data

(60) Provisional application No. 61/567,760, filed on Dec. 7, 2011.

(51) Int. Cl.
*G02B 6/36* (2006.01)

(52) U.S. Cl.
USPC ...... 385/89; 385/14; 398/2; 398/33; 398/135; 398/164; 356/73.1; 359/337.11; 375/219

(58) Field of Classification Search
CPC .................................. H04B 10/50; H05K 1/18
USPC ............. 385/89, 14; 361/748; 398/139, 2, 33, 398/135, 164; 356/73.1; 359/337.11; 375/219
See application file for complete search history.

(56) References Cited

U.S. PATENT DOCUMENTS

| 5,715,339 | A | | 2/1998 | Takai et al. | |
|---|---|---|---|---|---|
| 6,097,858 | A | * | 8/2000 | Laor | 385/16 |
| 2002/0181894 | A1 | * | 12/2002 | Gilliland et al. | 385/88 |
| 2003/0072538 | A1 | | 4/2003 | Jin et al. | |
| 2004/0067060 | A1 | * | 4/2004 | Aronson et al. | 398/135 |
| 2005/0058455 | A1 | * | 3/2005 | Aronson et al. | 398/135 |
| 2005/0196165 | A1 | * | 9/2005 | Dybsetter et al. | 398/22 |
| 2005/0243408 | A1 | * | 11/2005 | Dybsetter | 359/341.1 |

(Continued)

FOREIGN PATENT DOCUMENTS

WO  2008-124692  10/2008

OTHER PUBLICATIONS

Eng, Juli, Technology Trends & Innovation, Celebrating 20 Years, Finisar, 2008.*

(Continued)

*Primary Examiner* — Peter Radkowski
(74) *Attorney, Agent, or Firm* — Maschoff Brennan

(57) ABSTRACT

Chip identification pads for identification of integrated circuits in an assembly. In one example embodiment, an integrated circuit (IC) assembly includes a controller, a plurality of ICs, a shared communication bus connecting the controller to the plurality of ICs and configured to enable communication between the controller and each of the plurality of ICs, and a set of one or more chip identification pads formed on each IC. Each set of chip identification pads has an electrical connection pattern. The electrical connection pattern of each set is distinct from the electrical connection pattern on every other set. Each distinct electrical connection pattern represents a unique identifier of the corresponding IC thereby enabling the controller to distinguish between the ICs.

20 Claims, 6 Drawing Sheets

(56) References Cited

U.S. PATENT DOCUMENTS

| | | |
|---|---|---|
| 2006/0153570 A1 | 7/2006 | Nelson et al. |
| 2008/0126619 A1* | 5/2008 | Dybsetter ............... 710/51 |
| 2008/0152340 A1 | 6/2008 | Hung et al. |
| 2010/0080518 A1* | 4/2010 | Teo et al. ............... 385/92 |
| 2010/0092184 A1* | 4/2010 | Nguyen et al. .......... 398/192 |
| 2010/0325324 A1 | 12/2010 | Aronson et al. |
| 2011/0075965 A1 | 3/2011 | DeMeritt et al. |

OTHER PUBLICATIONS

High Speed Converter Division, Analog Devices, AN-877 Application Note, "Interfacing to High Speed ADCs via SPI", Dec. 2005—Revision 0: Initial Version.*

International Search Report and Written Opinion dated Jul. 23, 2013 as received in Application No. PCT/US2013/033382.

International Search Report and Written Opinion mailed Mar. 28, 2013 in related PCT Patent Application No. PCT/US2012/068504.

* cited by examiner

CHIP IDENTIFICATION PADS FOR IDENTIFICATION OF INTEGRATED CIRCUITS IN AN ASSEMBLY

CROSS REFERENCE TO A RELATED APPLICATION

This application claims priority to and the benefit of U.S. Provisional Patent Application Ser. No. 61/567,760, entitled MODULAR CIRCUIT FOR AN OPTICAL COMMUNICATION MODULE, which was filed on Dec. 7, 2011, and is hereby incorporated by reference in its entirety.

BACKGROUND

Electronic modules, such as electronic or optoelectronic transceiver or transponder modules, are increasingly used in electronic and optoelectronic communication. Electronic modules typically communicate with a host device by transmitting electrical signals to the host device and receiving electrical signals from the host device. These electrical signals can then be transmitted by the electronic module outside the host device as optical and/or electrical signals.

Some electronic modules include multiple integrated circuits (ICs) for optimizing the performance of internal components, such as transmitters and receivers, for example. One difficulty with the inclusion of multiple ICs is communication between the ICs and between one or more controllers of the electronic modules. In particular, it can be difficult to uniquely identify each individual IC in order to target a communication to a particular IC.

Past attempts to uniquely identify individual ICs have involved hardwiring unique identifiers into an IC using non-volatile memory or fuses, integrating a separate controller into each IC, or having a separate communication bus for each IC. Unfortunately, these solutions are difficult to design and involve extra manufacturing and operating expense.

BRIEF SUMMARY OF SOME EXAMPLE EMBODIMENTS

Example embodiments generally relate to chip identification pads for identification of integrated circuits in an assembly. More particularly, some embodiments relate to identification of integrated circuits in an assembly of an electronic module.

In one example embodiment, an integrated circuit (IC) assembly includes a controller, a plurality of ICs, a shared communication bus connecting the controller to the plurality of ICs and configured to enable communication between the controller and each of the plurality of ICs, and a set of one or more chip identification pads formed on each IC. Each set of chip identification pads has an electrical connection pattern. The electrical connection pattern of each set is distinct from the electrical connection pattern on every other set. Each distinct electrical connection pattern represents a unique identifier of the corresponding IC thereby enabling the controller to distinguish between the ICs.

In another example embodiment, a parallel optoelectronic module includes a plurality of transducers, a controller, a plurality of ICs electrically connected to the plurality of transducers, a shared communication bus that connects the controller to the plurality of ICs and configured to enable communication between the controller and each of the plurality of ICs, and a set of one or more chip identification pads formed on each IC. Each set of chip identification pads has an electrical connection pattern. The electrical connection pattern of each set is distinct from the electrical connection pattern on every other set. Each distinct electrical connection pattern represents a unique identifier of the corresponding IC thereby enabling the controller to distinguish between the ICs.

In yet another example embodiment, a parallel active optical cable includes a fiber-optic communications cable having one or more optical data transmission lines and first and second ends and first and second parallel optoelectronic transceiver modules attached to the first and second ends of the fiber-optic communications cable, respectively. Each of the first and second parallel optoelectronic transceiver modules includes a plurality of lasers, a plurality of photodiodes, a transmitter controller, a receiver controller, a plurality of laser driver ICs electrically connected to the plurality of lasers, a plurality of transimpedance amplifier ICs electrically connected to the plurality of photodiodes, a shared transmitter communication bus that connects the transmitter controller to the plurality of laser drivers ICs and configured to enable communication between the transmitter controller and each of the plurality of laser drivers ICs, a shared receiver communication bus that connects the receiver controller to the plurality of transimpedance amplifier ICs and configured to enable communication between the receiver controller and each of the plurality of transimpedance amplifier ICs, a memory formed on each IC, and a set of one or more chip identification pads formed on each IC. Each set of chip identification pads has an electrical connection pattern. The electrical connection pattern of each laser driver IC is distinct from the electrical connection pattern on every other laser driver IC. The electrical connection pattern of each transimpedance amplifier IC is distinct from the electrical connection pattern on every other transimpedance amplifier IC. Each distinct electrical connection pattern represents a unique identifier of the corresponding IC thereby enabling the corresponding controller to distinguish between the ICs.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify certain aspects of the present invention, a more particular description of the invention will be rendered by reference to example embodiments thereof which are disclosed in the appended drawings. It is appreciated that these drawings depict only example embodiments of the invention and are therefore not to be considered limiting of its scope. Aspects of the invention will be described and explained with additional specificity and detail through the use of the accompanying drawings in which.

DETAILED DESCRIPTION OF SOME EXAMPLE EMBODIMENTS

Example embodiments generally relate to chip identification pads for identification of integrated circuits (ICs) in an assembly. More particularly, some embodiments relate to identification of integrated circuits in an assembly of an electronic module. The example chip identification pads disclosed herein enable one or more controllers to communication with a plurality of ICs that can effectively self-identify across a shared communication bus. In at least some example embodiments, the example chip identification pads of the ICs enable each IC to uniquely self-identify without the extra difficulty and expense of integrating a separate controller into each IC or having a separate communication bus for each IC.

The embodiments described herein can be implemented in various electronic modules including optoelectronic modules. As used herein the term "optoelectronic module" includes modules having both optical and electrical components. Examples of electronic modules include, but are not limited to, active electrical cables, active optical cables, transponders, transceivers, transmitters, and/or receivers. Electronic modules can be used, for instance, in telecommunications networks, local area networks, metro area networks, storage area networks, wide area networks, and the like and can be configured to conform with one or more standardized form factors or multi-source agreements ("MSAs"), including QSFP, QSFP+, CXP, CXP2, CFP, XFP, and SFP+ form factors, without restriction. It will be appreciated, however, that the electronic modules need not comply with standardized form factor requirement and may have any size or configuration necessary according to a particular design.

The electronic modules, according to some embodiments, can be configured for electrical and/or optical signal transmission and reception at a variety of per-second data rates including, but not limited to, 10 Gigabits per second ("Gbps"), 40 Gbps, 100 Gbps, or higher. Furthermore, the electronic modules, according to some embodiments, can be configured for optical signal transmission and reception at various wavelengths including, but not limited to, 850 nm, 1310 nm, 1470 nm, 1490 nm, 1510 nm, 1530 nm, 1550 nm, 1570 nm, 1590 nm, or 1610 nm. Further, the electronic modules can be configured to support various transmission standards including, but not limited to, Ethernet, Fibre Channel, Infiniband and SONET/SDH.

Figure 1A:
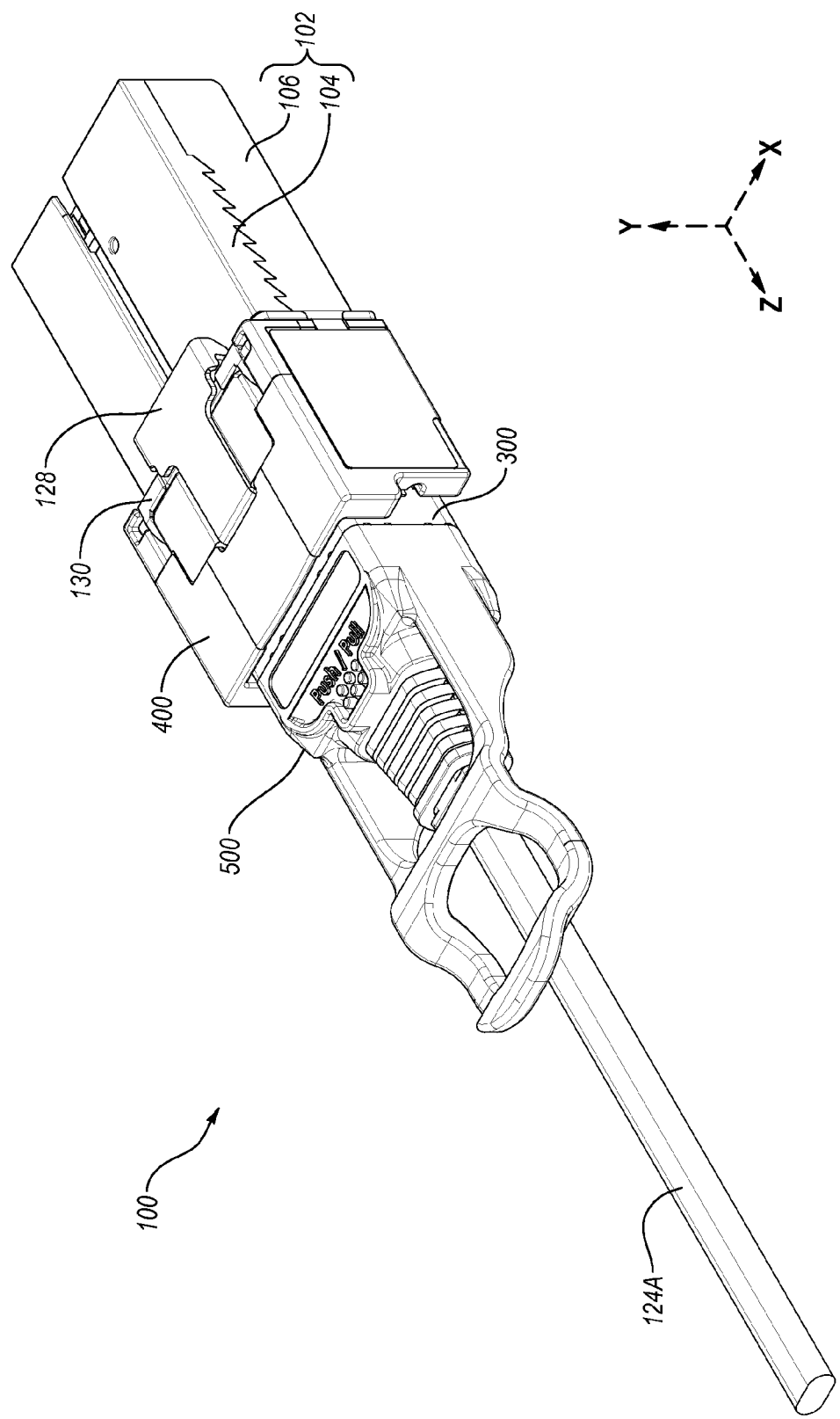
FIG. 1A is a top front perspective view of an example electronic module.
Figure 1B:
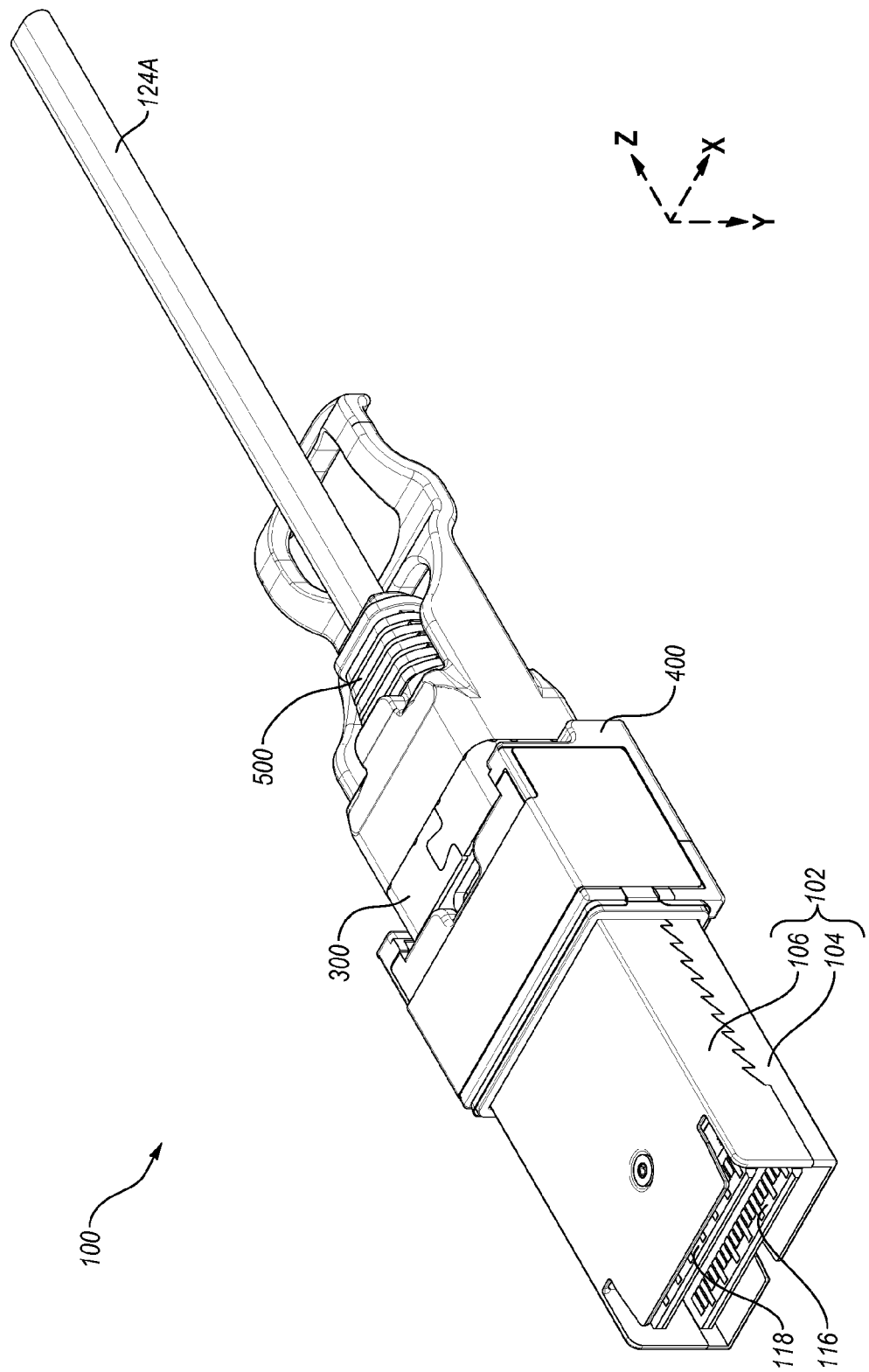
FIG. 1B is a bottom rear perspective view of the example electronic module of FIG. 1A.
Figure 1C:
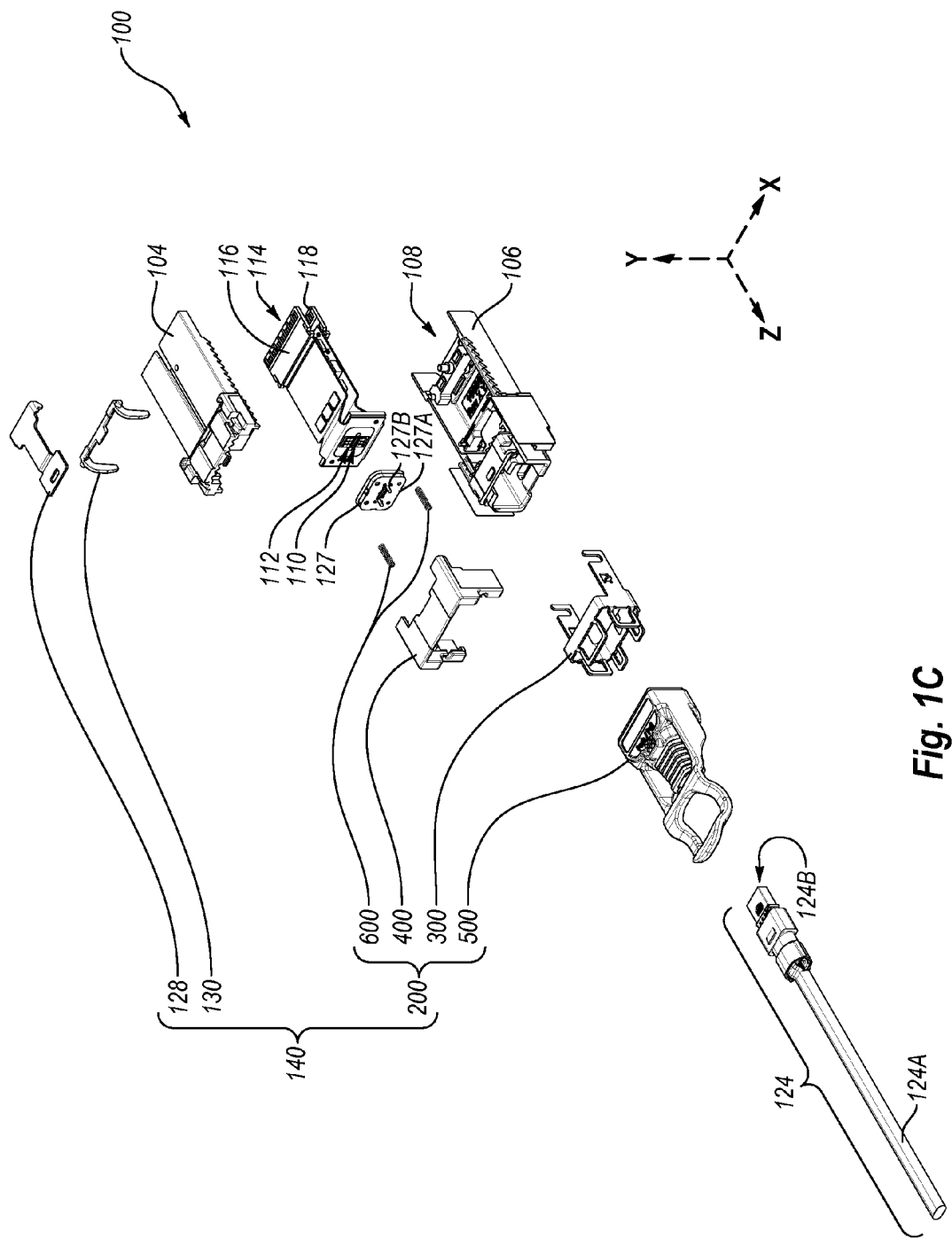
FIG. 1C is an exploded top front perspective view of the example electronic module.

Reference is first made to FIGS. 1A-1C, which depict an example electronic module 100 for use in transmitting and receiving optical signals in connection with a host device (not shown) that is operatively connected in some embodiments to a communication network (not shown). FIGS. 1A-1C include, respectively, a front top perspective view, a bottom rear perspective view, and an exploded front top perspective view of the module 100.

As illustrated in FIGS. 1A-1C, the module 100 includes a shell 102 made up of a top shell 104 and a bottom shell 106 (shell 102 is not shown independently in FIG. 1C). Although the shell 102 is illustrated as being made up of two components (i.e., top shell 104 and bottom shell 106), the shell 102 can alternately or additionally be made up of a unitary component and/or two or three or more components.

As best seen in FIG. 1C, the top shell 104 and bottom shell 106 define a cavity, generally indicated at 108, within which are disposed an array of optical transmitters 110 and an array of optical receivers 112. In this and some other examples, the optical transmitters 110 are arranged in a 12×1 array of vertical cavity surface emitting lasers ("VCSELs") and the optical receivers 112 are arranged in a 12×1 array of p-type, intrinsic, n-type ("PIN") photodiodes. Each optical receiver 112 may receive optical signals from a fiber (not shown) of a cable assembly 124 and may act as an opto-electric transducer by transforming the optical signal into an electrical signal. Similarly, each of the optical transmitters 110 may transmit electrical signal from a host device (not shown) and may act as an electro-optic transducer by emitting optical signals into a fiber (not shown) of the cable assembly 124.

Alternately, the optical transmitters 110 can include other types of optical transmitters, such as edge-emitting lasers, in the same or different quantities or configurations. Similarly, the optical receivers 112 can alternately include other types of optical receivers in the same or different quantities or configurations. In other embodiments, the module 100 implements electrical transmitters and receivers, rather than optical transmitters and receivers 110 and 112.

A printed circuit board assembly ("PCBA") 114 is at least partially disposed in the cavity 108. The PCBA 114 includes, among other things, edge connectors 116 and 118. The edge connectors 116 and 118 interface with a host device to communicate electrical data signals between the host device and the module 100. Electrical data signals received from the host device are provided to the optical transmitters 110 to emit optical data signals representative of the received electrical data signals. Additionally, optical data signals can be received by the optical receivers 112, which convert the received optical data signals to electrical data signals and provide the electrical data signals to the host device via one or both of the edge connectors 116 and 118.

With continued reference to FIG. 1C, a cable assembly 124 is provided that includes a plurality of optical fibers (not shown) disposed within cable cladding 124A and a fiber optic connector 124B. In other examples, the cable assembly 124 includes a plurality of electrical wires and an electrical connector, rather than optical fibers and a fiber optic connector 124B. Alternately, the cable assembly 124 is omitted altogether in some configurations.

The optical fibers of cable assembly 124 may include, for example, 12 transmit multimode parallel ribbon fibers and 12 receive multimode parallel ribbon fibers, or a total of 24 multimode parallel ribbon fibers. In other examples, the optical fibers are multimode fibers or single mode fibers having any number of transmit fibers and any number of receive fibers implemented in a parallel ribbon or as individual fibers.

The module 100 additionally includes a lens block 127 with overmolded lens pins 127A and 127B. The fiber optic connector 124B, lens block 127 and lens pins 127A and 127B collectively cooperate to align the optical fibers of the cable assembly 124 with the optical transmitters 110 and optical receivers 112 such that optical signals can be emitted onto and/or received from the optical fiber(s) of cable assembly 124.

The module 100 further includes a latching mechanism 140 (FIG. 1C) having a latch 128 (FIGS. 1A & 1C), a cam 130 (FIGS. 1A & 1C) and a spring assembly 200 (FIG. 1C). The spring assembly 200 may include a spring assembly slider 300 (FIGS. 1A-1C), a latch cover 400 (FIGS. 1A-1C), a boot 500 (FIGS. 1A-1C), and one or more springs 600 (FIG. 1C). Briefly, the latching mechanism 140 is configured to selectively secure the module 100 within a receptacle of a host device.

As shown in FIGS. 1A-1C, the module 100 is implemented as a parallel active optical cable where two identical modules 100 (only one of which is shown in the Figures) are physically connected via optical transmission media (e.g., the optical fibers of cable assembly 124). Other embodiments include active electrical cables as well as modules lacking integrated transmission media.

Furthermore, as illustrated in FIGS. 1A-1C, the module 100 is substantially compliant with the CXP form factor as defined by the Infiniband Trade Association. In other embodiments, the module 100 is configured to be substantially compliant with other form factors including, but not limited to, the CFP, XFP or SFP+ form factors.

Figure 2A:
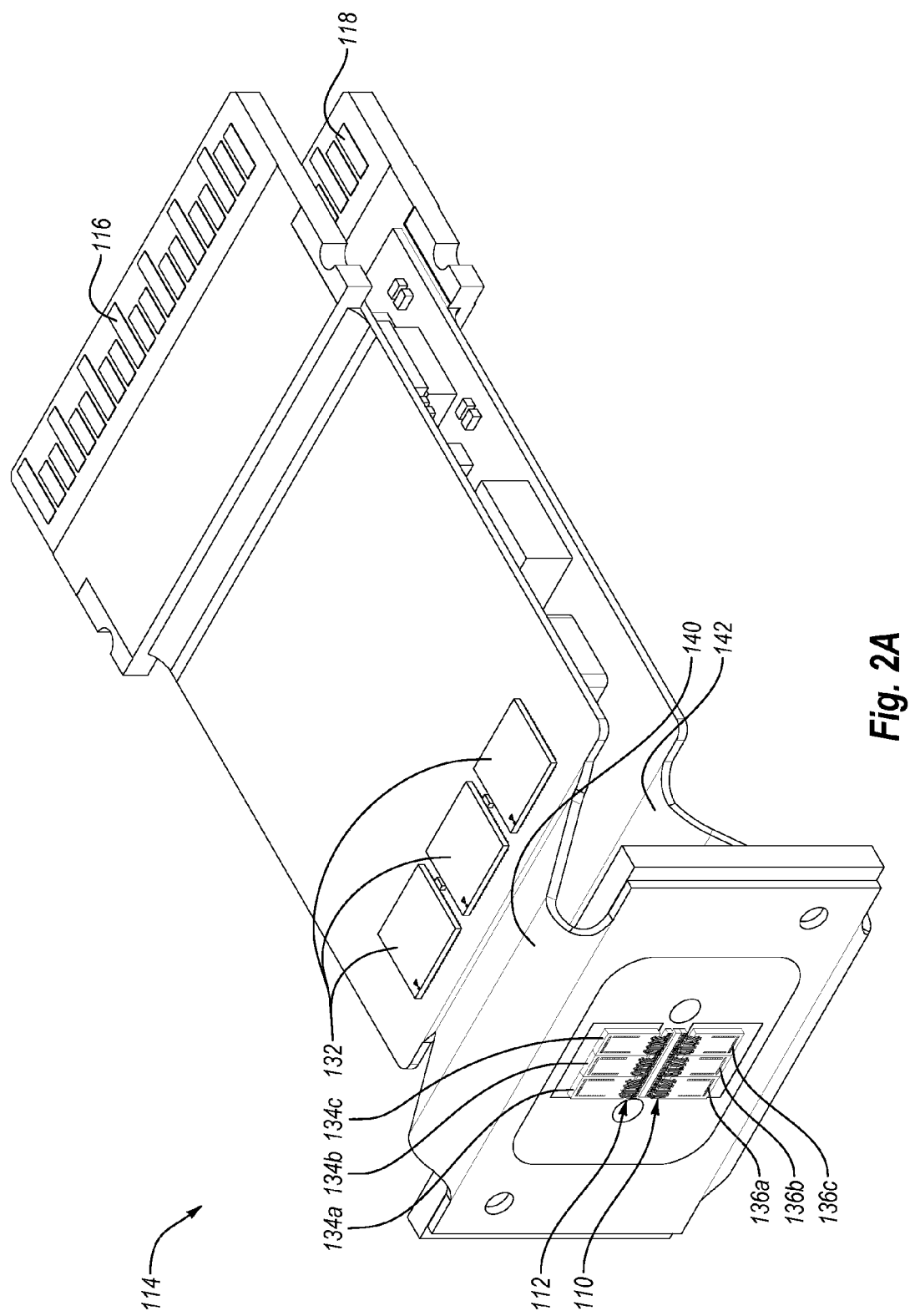
FIG. 2A is a top front perspective view of an example printed circuit board assembly (PCBA) of the example electronic module of FIG. 1A.
Figure 2B:
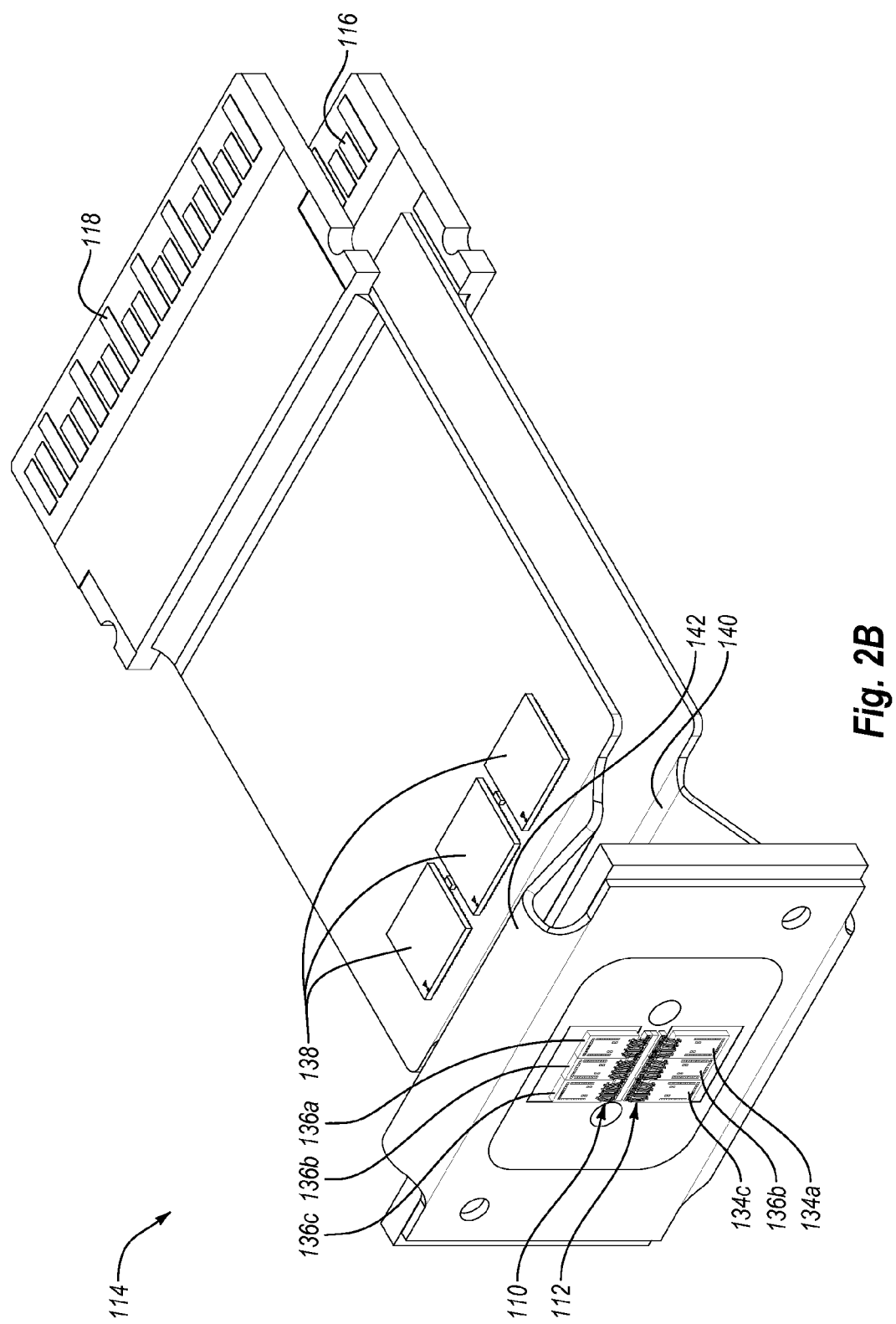
FIG. 2B is a bottom front perspective view of the example PCBA of FIG. 2A.

FIGS. 2A and 2B disclose top and bottom front perspective views of the PCBA 114, respectively. As disclosed in FIGS. 2A and 2B, the PCBA 114 includes the edge connector 116, receiver controllers 132, identical transimpedance amplifier ICs 134a, 134b, and 134c, the optical receivers 112, the optical transmitters 110, identical laser driver ICs 136a, 136b, and 136c, transmitter controllers 138, and the edge connector 118. FIGS. 2A and 2B also disclose a shared receiver communication bus 140 and a shared transmitter communication bus 142. The shared receiver communication bus 140 connects the receiver controllers 132 to the transimpedance amplifier ICs 134a, 134b, and 134c and is configured to enable communication between the receiver controllers 132 and each of the transimpedance amplifier ICs 134a, 134b, and 134c. Similarly, the shared transmitter communication bus 142 connects the transmitter controllers 138 to the laser driver ICs 136a, 136b, and 136c and configured to enable communication between the transmitter controllers 138 and each of the plurality of laser driver ICs 136a, 136b, and 136c.

Figure 2C:
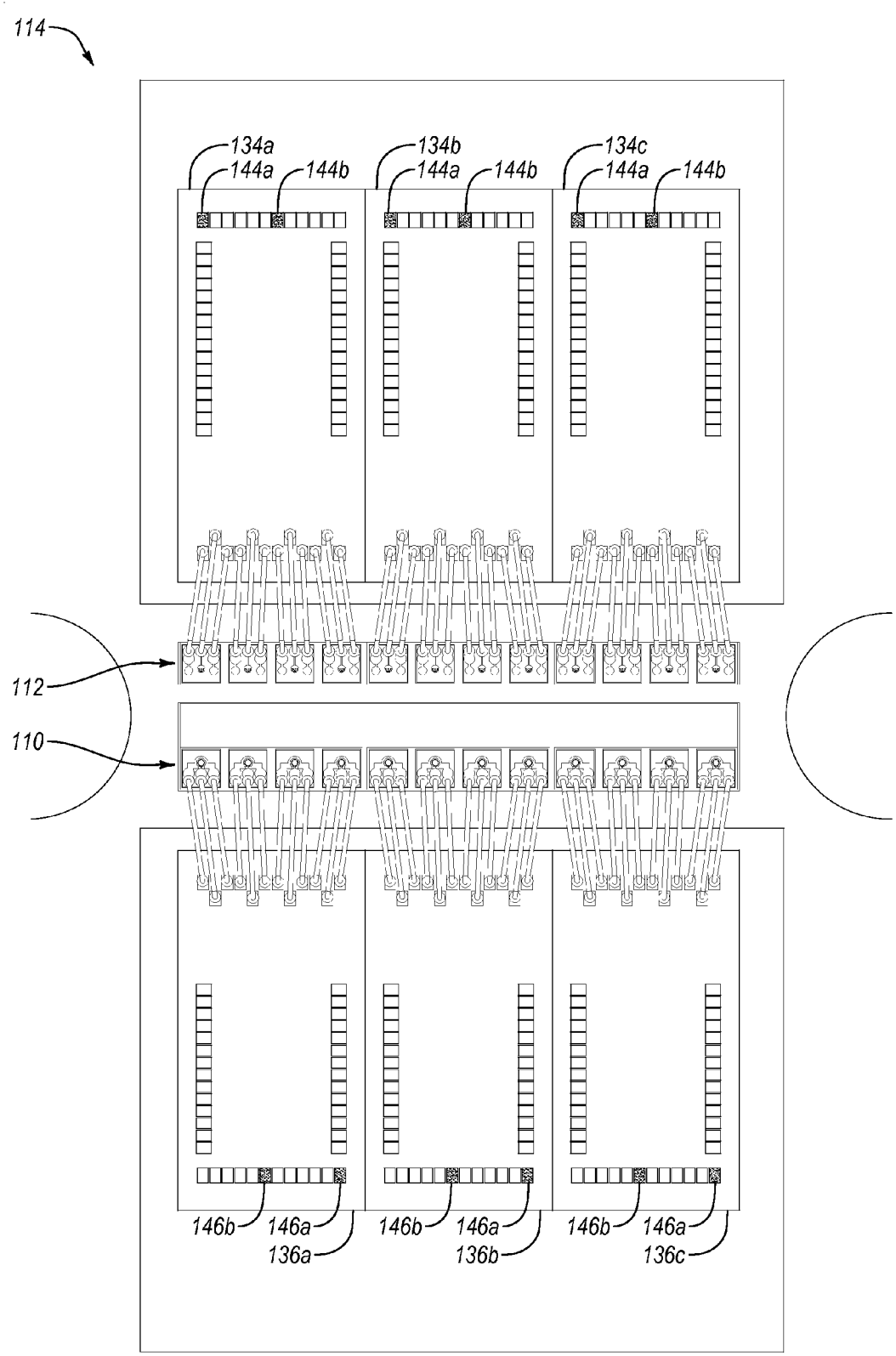
FIG. 2C is a front view of a portion of the example PCBA of FIG. 2A.

FIG. 2C is a front view of a portion of the example PCBA 114. As disclosed in FIG. 2A, each of the transimpedance amplifier ICs 134a-134c is electrically connected to four of the optical receivers 112, using wire-bond or flip-chip techniques, for example. As such, each of the transimpedance amplifier ICs 134a-134c is configured to function as four transimpedance amplifiers for the optical signals received by four separate optical receivers 112. Similarly, each of the laser driver ICs 136a-136c is electrically connected to the plurality of optical transmitters 110, using wire-bond or flip-chip techniques, for example. As such, each of the laser driver ICs 136a-136c is configured to function as four laser drivers for the optical signals transmitted by four optical transmitters 110. It is understood, however, that four is but one example channel quantity for the ICs 134a-134c and 136a-136c, and each of the ICs 134a-134c and 136a-136c could instead be configured to function in connection with fewer than four transducers or greater than four transducers.

As disclosed in FIG. 2C, each of the IC's 134a-134c and 136a-136c includes a set of one or more chip identification pads formed thereon. In particular, the transimpedance amplifier ICs 134a-134c each includes a set of chip identification pads that includes two chip identification pads 144a and 144b and the laser driver ICs 136a-136c each includes a set of chip identification pads that includes two chip identification pads 146a and 146b. Each set of chip identification pads 144a and 144b or 146a and 146b is configured to have a distinct electrical connection pattern. The distinct electrical connection pattern of each IC enables the IC to be distinguished from other identical ICs.

For example, during the manufacturing process of the PCBA 114, the electrical connection pattern of each set of chip identification pads 144a and 144b can be set to be distinct from the electrical connection pattern on every other set of chip identification pads 144a and 144b. In this way, each distinct electrical connection pattern can represent a unique identifier of the corresponding IC, thereby enabling each of the receiver controllers 132 to distinguish between the identical ICs. In at least some example embodiments, each distinct electrical connection pattern is created by electrically placing each chip identification pad 144a and 144b in one of two binary states. For example, the two binary states may be created by connecting each chip identification pads 144a and 144b to a known voltage or leaving each chip identification pad unconnected. The known voltage may be electrical ground, for example. It is understood, however, that any other known voltage and a non-connection, or combinations of known voltages, may be employed as the two binary states of each chip identification pad. For example, instead of employing a non-connection and a ground, a ground and a positive voltage, or a ground and a negative voltage, may be employed.

In one example embodiment, the transimpedance amplifier ICs 134a-134c may be assigned during manufacturing the unique identifiers of zero (0), one (1), and two (2), respectively. In order to assign the unique identifier of zero (0) to the transimpedance amplifier IC 134a, the chip identification pads 144a and 144b of the transimpedance amplifier IC 134a may each be left unconnected, thereby representing a binary '00' or a decimal '0'. Similarly, in order to assign the unique identifier of one (1) to the transimpedance amplifier IC 134b, the chip identification pad 144a of the transimpedance amplifier IC 134b may be left unconnected while the chip identification pads 144b of the transimpedance amplifier IC 134b is connected to electrical ground, thereby representing a binary '01' or a decimal '1'. Finally, in order to assign the unique identifier of two (2) to the transimpedance amplifier IC 134c, the chip identification pad 144a of the transimpedance amplifier IC 134c may be connected to electrical ground while the chip identification pad 144b of the transimpedance amplifier IC 134c is left unconnected, thereby representing a binary '10' or a decimal '2'. Then, each time the transimpedance amplifier ICs 134a-134c are initialized, their respective chip identification pads 144a and 144b can be examined in order to determine that the unique identifiers of the transimpedance amplifier ICs 134a-134c are zero (0), one (1), and two (2), respectively. This determination may be performed by any one of the receiver controllers 132 (see FIG. 2A), for example.

Upon the determination at initialization of the unique identifier of each of the transimpedance amplifier ICs 134a-134c, the unique identifier of each transimpedance amplifier IC may be stored in a memory (not shown) formed on the transimpedance amplifier IC. This storing may be performed by any one of the receiver controllers 132 (see FIG. 2A), for example. Subsequently, when any one of the receiver controllers 132 attempts to communicate with a target transimpedance amplifier IC over the shared receiver communication bus 140, the receiver controllers 132 may each be configured to read the unique identifier from the memory to determine if the corresponding transimpedance amplifier IC is the target transimpedance amplifier IC.

In at least some example embodiments, the memory (not shown) formed on each transimpedance amplifier IC may be a volatile memory. Use of a relatively small volatile memory may remove the need for a non-volatile memory on each transimpedance amplifier IC and the space on the transimpedance amplifier IC that would be required for a non-volatile memory, resulting in the ability to reduce the size of each transimpedance amplifier IC, which can be especially important in multi-channel optoelectronic transceiver modules such as the electronic module 100.

The shared receiver communication bus 140 may be a serial peripheral interface bus, such as the Finisar Serial Bus (FSB) for example, that allows communication between the receiver controllers 132 and the transimpedance amplifier ICs 134a-134c. One example implementation of the FSB is disclosed in U.S. Pat. No. 7,657,680, the disclosure of which is incorporated herein by reference in its entirety. In some embodiments, the transimpedance amplifier ICs 134a-134c may be connected together on the shared receiver communication bus 140 in a daisy chain configuration. In this daisy chain configuration, one of the transimpedance amplifier ICs 134a-134c may act as a master transimpedance amplifier ICs 134a-134c and the remaining transimpedance amplifier ICs may act as slaves.

The master transimpedance amplifier IC may be able to communicate information to and from a separate memory device (not shown) to the slave transimpedance amplifier ICs. The separate memory device may contain information used by all of the transimpedance amplifier ICs in the electronic module 100 during initialization and to optimize the performance of the transimpedance amplifier ICs. Additionally or alternately, the separate memory device may be used to store information about the transimpedance amplifier ICs. Additionally or alternately, the separate memory device may be used to store information generated by the transimpedance amplifier ICs.

Using this daisy chain configuration, a separate memory device for every transimpedance amplifier ICs may not be required. Furthermore, using this daisy chain configuration reduces the number of leads needed to connect each transimpedance amplifier IC to a memory device. Additionally, using this daisy chain configuration may allow each transimpedance amplifier IC to have similar ports, which may facilitate the transimpedance amplifier IC being modular.

Although the example configurations disclosed above involve the sets of chip identification pads 144a and 144b formed on the transimpedance amplifier ICs 134a-134c as they communicate with the receiver controllers 132 across the shared receiver communication bus 140, it is understood that similar example configurations apply equally to the sets of chip identification pads 146a and 146b formed on the laser driver ICs 136a-136c as they communicate with the transmitter controllers 134 across the shared transmitter communication bus 142.

The example chip identification pads disclosed herein enable one or more controllers to communication with a plurality of identical ICs that can effectively self-identify across a shared communication bus. In at least some example embodiments, the example chip identification pads of the identical ICs enable each IC to uniquely self-identify without the extra difficulty and expense of integrating a separate controller into each IC or having a separate communication bus for each IC. Further, the example chip identification pads of the ICs may enable channel and IC-specific digital diagnostics.

The present invention may be embodied in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A printed circuit board assembly (PCBA) comprising:
a controller;
a plurality of integrated circuits (ICs);
a shared communication bus connecting the controller to the plurality of ICs and configured to enable communication between the controller and each of the plurality of ICs;
a set of one or more chip identification pads formed on each IC, each set of chip identification pads having an electrical connection pattern that is independent of the controller, the electrical connection pattern of each set being distinct from the electrical connection pattern on every other set, each distinct electrical connection pattern representing a unique identifier of the corresponding IC thereby enabling the ICs to self-identify to the controller and enabling the controller to distinguish between the ICs.

2. The PCBA as recited in claim 1, wherein the electrical connection pattern is created by electrically placing each chip identification pad in one of two binary states.

3. The PCBA as recited in claim 1, wherein the two binary states are created by connecting each chip identification pad to a known voltage or leaving each chip identification pad unconnected.

4. The PCBA as recited in claim 1, further comprising a memory formed on each IC, and each IC is configured to store the unique identifier in its memory upon initialization of the IC.

5. The PCBA as recited in claim 4, wherein when the controller attempts to communicate with a target IC, the controller is configured to read the unique identifier from the memory to determine if the corresponding IC is the target IC.

6. The PCBA as recited in claim 1, wherein each IC is configured to function as multiple laser drivers for multiple lasers.

7. The PCBA as recited in claim 6, wherein each IC is configured to function as four laser drivers for four vertical cavity surface emitting lasers (VCSELS).

8. The PCBA as recited in claim 1, wherein each IC is configured to function as multiple transimpedance amplifiers for multiple photodiodes.

9. The PCBA as recited in claim 8, wherein each IC is configured to function as four transimpedance amplifiers for four p-type, intrinsic, n-type ("PIN") photodiodes.

10. A parallel optoelectronic module comprising:
a plurality of transducers;
a controller;
a plurality of ICs electrically connected to the plurality of transducers;
a shared communication bus that connects the controller to the plurality of ICs and configured to enable communication between the controller and each of the plurality of ICs; and
a set of one or more chip identification pads formed on each IC, each set of chip identification pads having an electrical connection pattern that is independent of the controller, the electrical connection pattern of each set being distinct from the electrical connection pattern on every other set, each distinct electrical connection pattern representing a unique identifier of the corresponding IC thereby enabling the ICs to self-identify to the controller and enabling the controller to distinguish between the ICs.

11. The parallel optoelectronic module as recited in claim 10, wherein the electrical connection pattern is created by electrically placing each chip identification pad in one of two binary states.

12. The parallel optoelectronic module as recited in claim 11, wherein the two binary states are created by connecting each chip identification pad to a known voltage or leaving each chip identification pad unconnected.

13. The parallel optoelectronic module as recited in claim 12, wherein the known voltage is electrical ground.

14. The parallel optoelectronic module as recited in claim 10, further comprising a memory formed on each IC, and each memory is configured to store the unique identifier upon initialization of the corresponding IC such that when the controller attempts to communicate with a target IC, the controller is configured to read the unique identifier from the memory to determine if the corresponding IC is the target IC.

15. The parallel optoelectronic module as recited in claim 10, wherein each IC is configured to function as four transimpedance amplifiers or four laser drivers.

16. A parallel active optical cable comprising:
  a fiber-optic communications cable comprising one or more optical data transmission lines, the fiber-optic communications cable having first and second ends; and
  first and second parallel optoelectronic transceiver modules attached to the first and second ends of the fiber-optic communications cable, respectively, each parallel optoelectronic transceiver module comprising:
  a plurality of lasers;
  a plurality of photodiodes;
  a transmitter controller;
  a receiver controller;
  a plurality of laser driver ICs electrically connected to the plurality of lasers;
  a plurality of transimpedance amplifier ICs electrically connected to the plurality of photodiodes;
  a shared transmitter communication bus that connects the transmitter controller to the plurality of laser drivers ICs and configured to enable communication between the transmitter controller and each of the plurality of laser drivers ICs;
  a shared receiver communication bus that connects the receiver controller to the plurality of transimpedance amplifier ICs and configured to enable communication between the receiver controller and each of the plurality of transimpedance amplifier ICs;
  a memory formed on each IC; and
  a set of one or more chip identification pads formed on each IC, each set of chip identification pads having an electrical connection pattern that is independent of the corresponding controller, the electrical connection pattern of each laser driver IC being distinct from the electrical connection pattern on every other laser driver IC, the electrical connection pattern of each transimpedance amplifier IC being distinct from the electrical connection pattern on every other transimpedance amplifier IC, each distinct electrical connection pattern representing a unique identifier of the corresponding IC thereby enabling each IC to self-identify to the corresponding controller and enabling the corresponding controller to distinguish between the ICs.

17. The parallel active optical cable as recited in claim 16, wherein the electrical connection pattern is created by electrically placing each chip identification pad in one of two binary states.

18. The parallel active optical cable as recited in claim 17, wherein the two binary states are created by connecting each chip identification pad to a known voltage or leaving each chip identification pad unconnected.

19. The parallel active optical cable as recited in claim 18, wherein the known voltage is electrical ground.

20. The parallel active optical cable as recited in claim 16, wherein each memory is configured to store the unique identifier upon initialization of the corresponding IC such that when the corresponding controller attempts to communicate with a target IC, the controller is configured to read the unique identifier from the memory to determine if the corresponding IC is the target IC.

* * * * *